United States Patent [19]

Morris

[11] 3,979,133
[45] Sept. 7, 1976

[54] FOLDABLE TRAILER
[75] Inventor: William E. Morris, Appleton, Wis.
[73] Assignee: Spec-Co Industries, Inc., Appleton, Wis.
[22] Filed: Sept. 8, 1975
[21] Appl. No.: 610,918

[52] U.S. Cl. .............................. 280/42; 280/491 A; 296/27
[51] Int. Cl.² ........................................ B62D 21/14
[58] Field of Search ........ 280/491 R, 491 A, 491 B, 280/491 C, 491 D, 34 A, 36 R, 36 C, 39, 40, 42; 296/27

[56] References Cited
UNITED STATES PATENTS

| | | | |
|---|---|---|---|
| 2,380,016 | 7/1945 | Black | 280/42 |
| 2,471,462 | 5/1949 | Toth | 280/36 R |
| 2,706,881 | 4/1955 | McDonald | 280/34 A |
| 2,720,413 | 10/1955 | Halverson | 280/36 R |
| 3,781,030 | 12/1973 | Ekedal | 280/42 X |
| 3,815,768 | 6/1974 | Goodwin | 280/34 A |

Primary Examiner—M. H. Wood, Jr.
Assistant Examiner—John A. Pekar
Attorney, Agent, or Firm—McDougall, Hersh & Scott

[57] ABSTRACT

A foldable trailer having a frame formed of a pair of side frame members pivoted at their forward ends for movement in the direction toward and away from each other between folded and unfolded positions respectively, a tail gate pivoted at one end to one of the side frame members with means for securing the other end to the other of the side frame members when in unfolded position, a mid cross bar member pivoted to the other of the side frame members and means for securing the other end of the mid cross bar to the opposite side member when in unfolded position, wing members pivotally mounted on the forward end portions of the side frame members for movement between folded and unfolded positions with means for latching the wing members in unfolded position, a wheel supporting axle subdivided into sections for collapse and means for securing the sections when in unfolded position to extend crosswise of the side frame members, and a floor panel adapted to be supported on the frame when in unfolded position.

11 Claims, 16 Drawing Figures

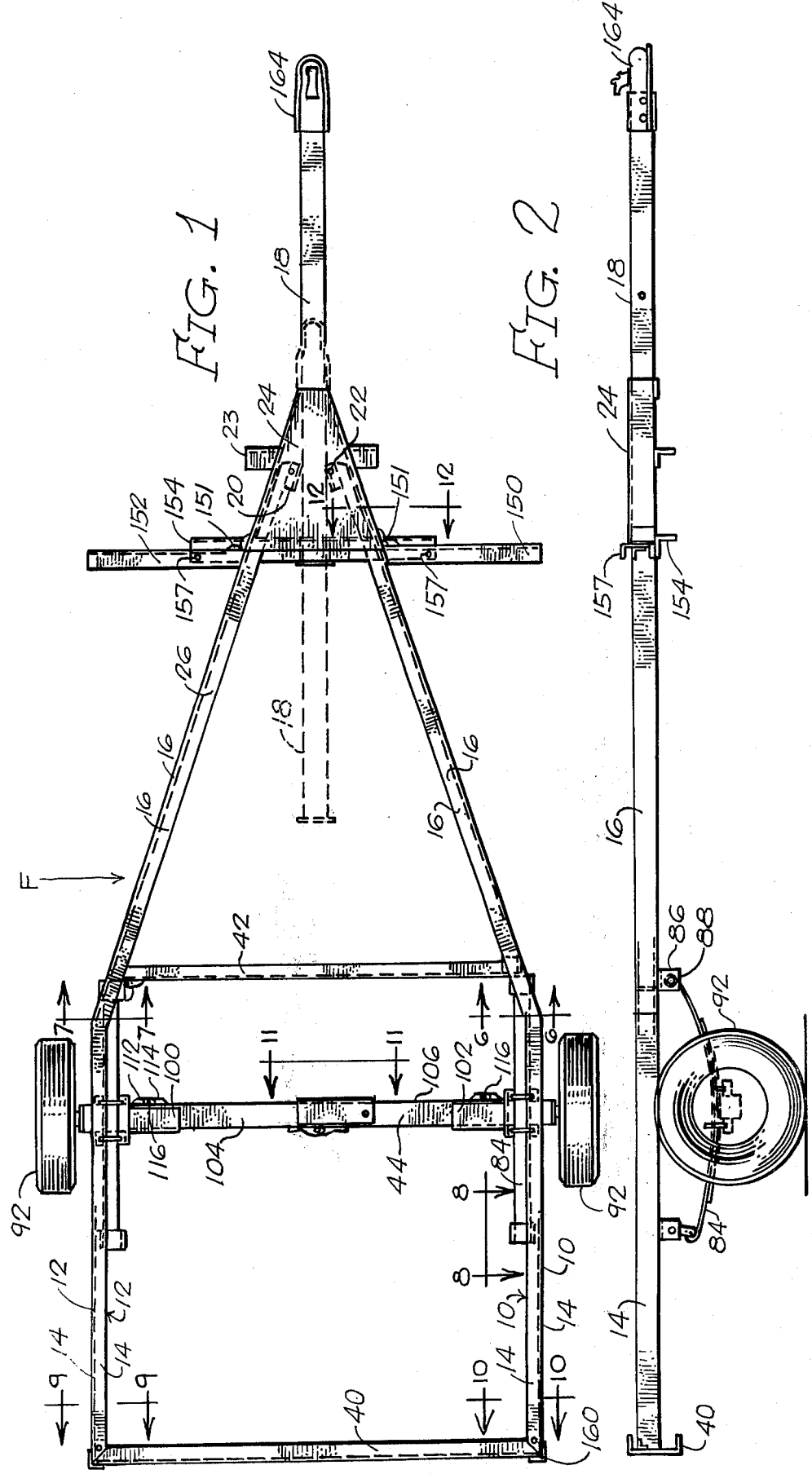

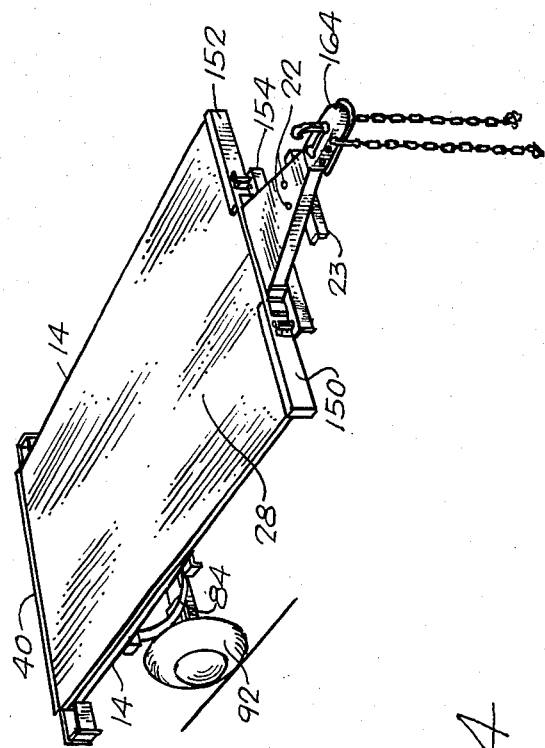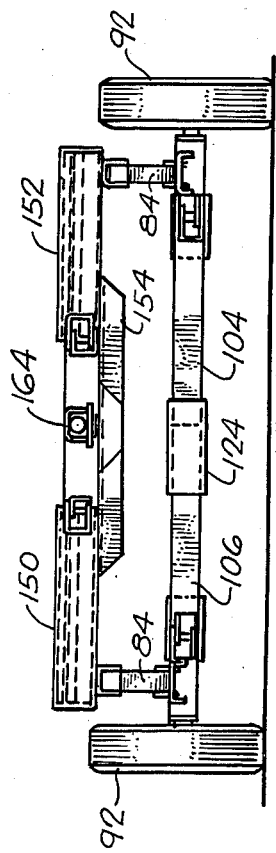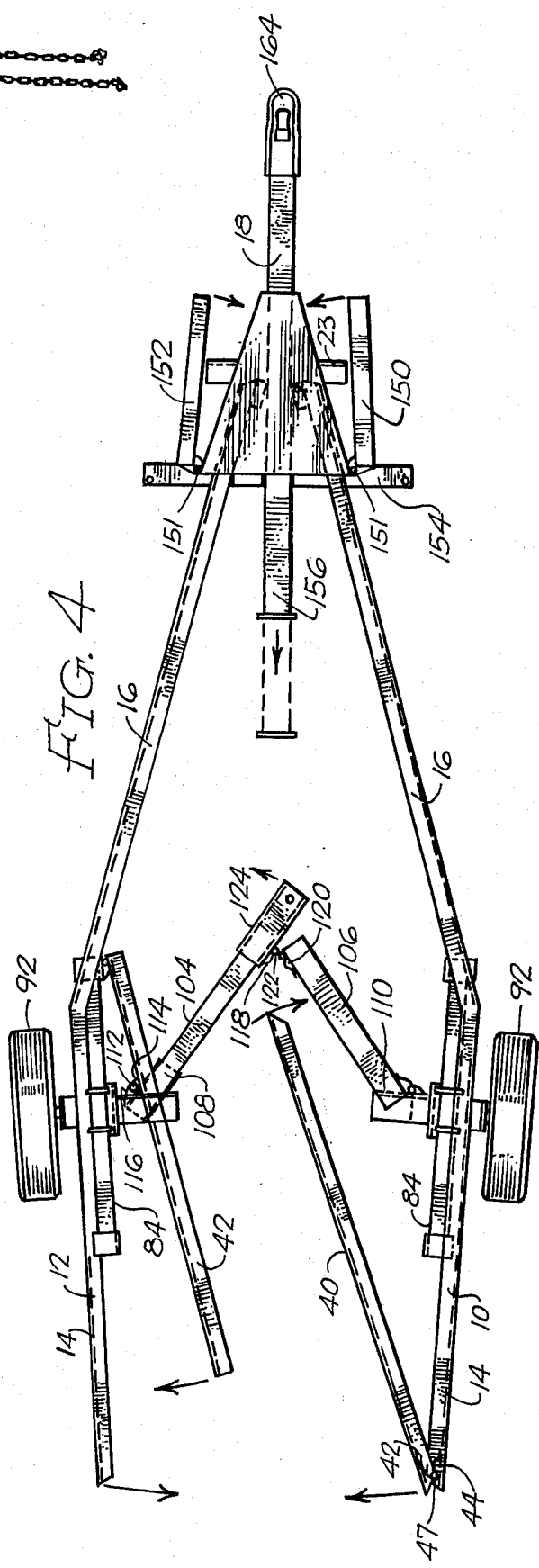

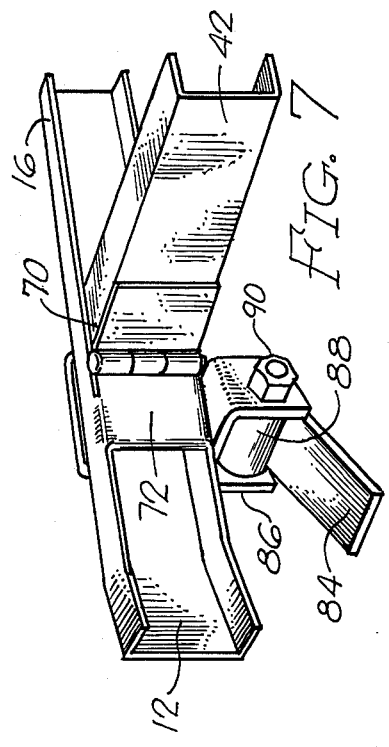
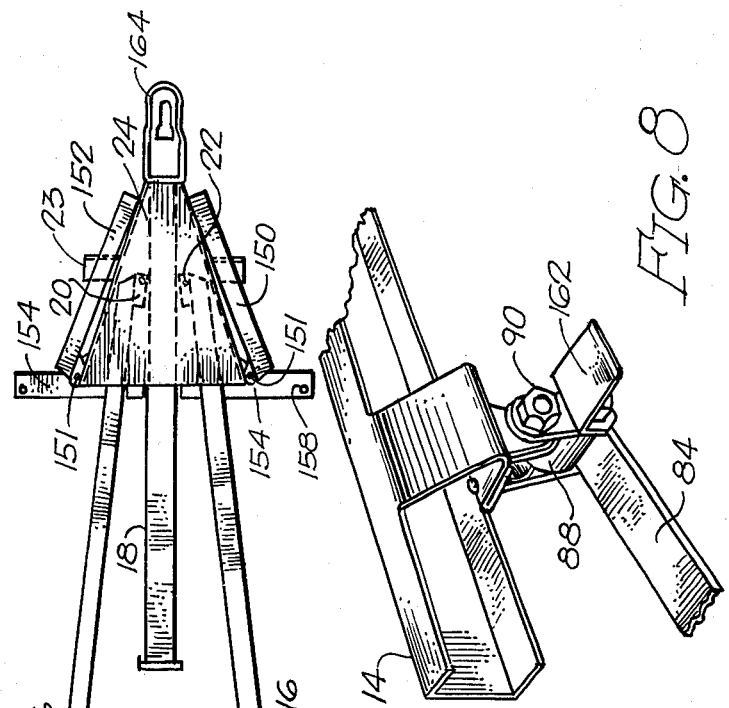
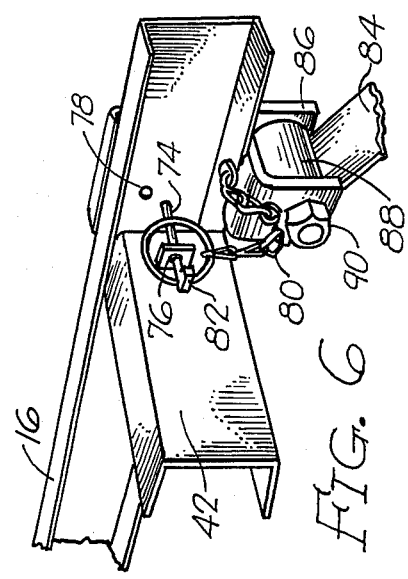
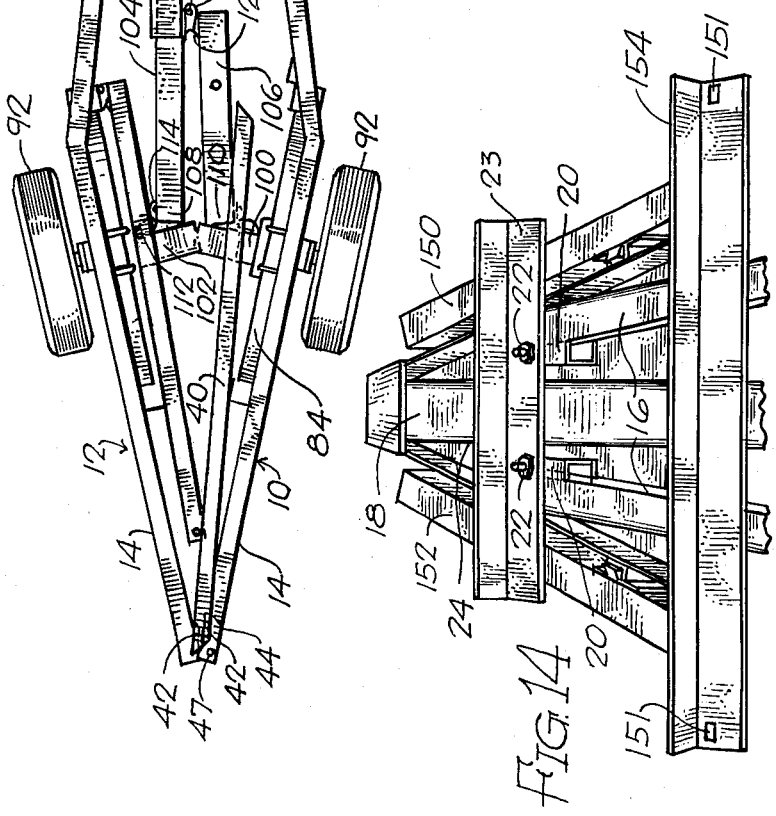

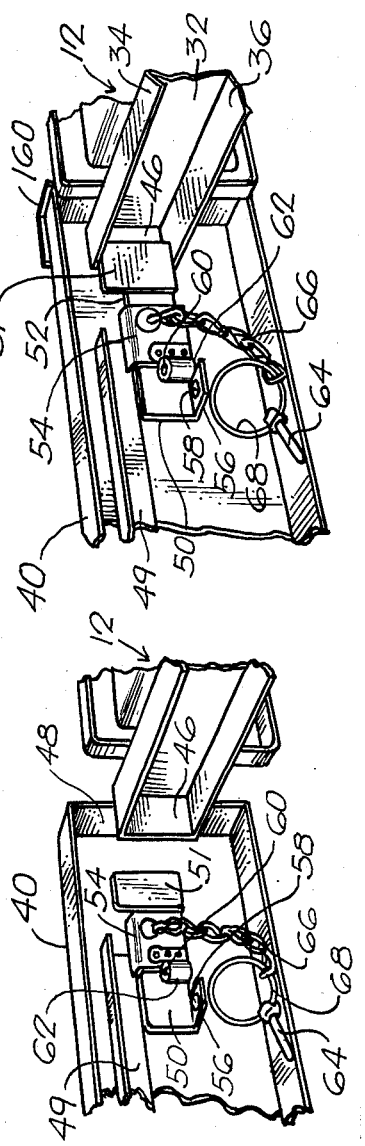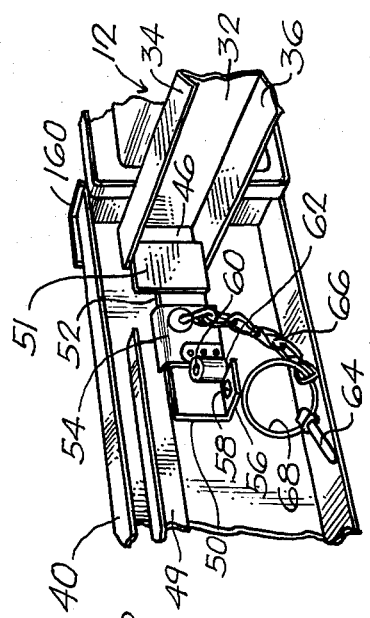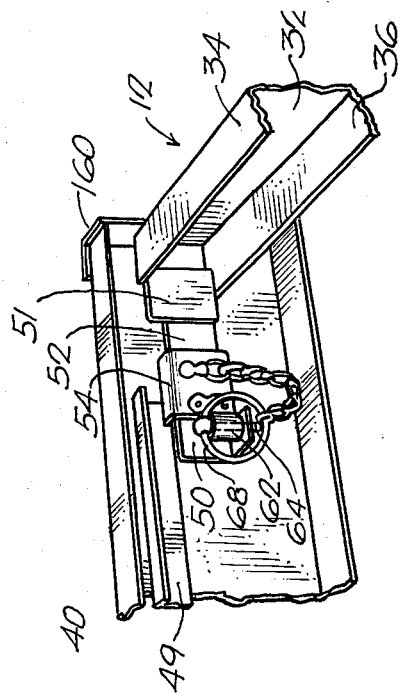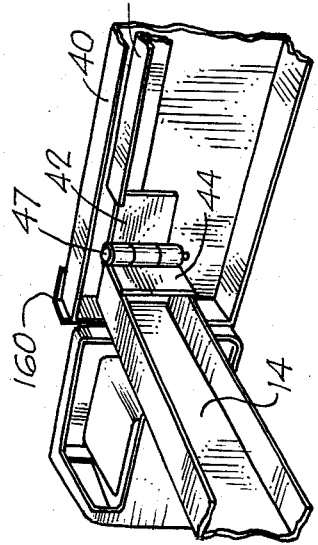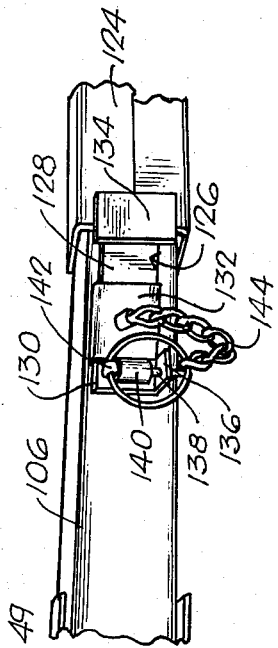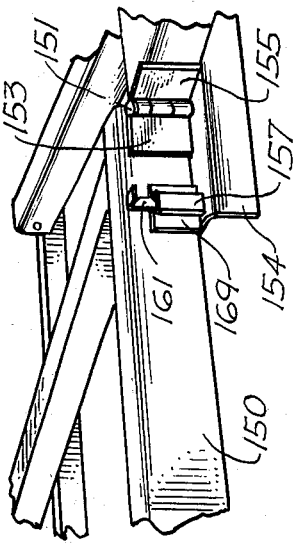

FOLDABLE TRAILER

This invention relates to a trailer which can be folded into a compact assembly that occupies a minimum of space for storage during periods of non-use and which opens into a sturdy trailer, capable of carrying a heavy load during travel over a road, when hitched to a power operated wheeled vehicle.

It is an object of this invention to produce a folding trailer of the type described which can be constructed of low cost and readily available materials, which can be folded and unfolded in a simple and efficient manner without the need for special tools or skilled labor, which, when in folded position, occupies a minimum of space for storage and the like, and which, when in unfolded position, represents a sturdy trailer capable of carrying relatively heavy loads, and which embodies means for retaining the trailer in unfolded position for safe and secure operation of the trailer over the road while being pulled by a prime mover or other motor driven vehicle.

These and other objects and advantages of this invention will hereinafter appear and for purposes of illustration, but not of limitation, an embodiment of the invention is shown in the accompanying drawings in which FIG. 1 is a top plan view of the trailer embodying the features of this invention shown in open or unfolded position;

FIG. 2 is a side elevational view of the trailer shown in FIG. 1;

FIG. 3 is a rear end elevational view of the trailer shown in FIGS. 1 and 2;

FIG. 4 is a top view of the trailer shown in FIGS. 1 and 2, in the partially folded position;

FIG. 5 is a top view similar to that of FIG. 4 showing the trailer in the folded position;

FIG. 6 is a perspective view showing the portion of the trailer frame at the point of engagement of mid cross bar with a side channel member;

FIG. 7 is a perspective view showing a portion of the trailer frame where the mid cross bar is hinged to the opposite side channel member;

FIG. 8 is a perspective view showing the support for the tail gate, when in folded position;

FIG. 9 is a perspective view showing the means for securing the tail gate to the side frame member with the elements in their disengaged position;

FIG. 9a is a perspective view similar to that of FIG. 9 showing the elements in position for interengagement;

FIG. 9b is a perspective view similar to that of FIG. 9 showing the elements locked in unfolded position;

FIG. 10 is a perspective view showing the opposite end of the tail gate hingedly connected to a side frame member;

FIG. 11 is a perspective view showing a portion of the axle assembly locked in operative position;

FIG. 12 is a perspective view showing the front wing members spread to unfolded position with means to secure the wing members;

FIG. 13 is a perspective view of the trailer in position of use with the floor panel supported by the suspended frame; and FIG. 14 is a perspective view taken from the underside to show the tongue plate and pivot for the side frame members.

Referring now to the drawings, the trailer, embodying the features of this invention, will be described with reference to the arrangement of the elements when in open or unfolded position, as shown in FIG. 1. The base frame F comprises a pair of side frame members 10 and 12 including rear sections 14 which extend in spaced parallel relation and forward sections 16 which extend integrally from the forward end of the rear section 14 in a direction to converge gradually toward the center line of the trailer, and which are hingedly connected at their forward ends on opposite sides of a tongue 18, for rocking movement of the side frame members about a horizontal plane between open or unfolded position, shown in FIG. 1, and closed or folded position, shown in FIG. 5. For this purpose, the forward end portions of the side frame members are provided with a bracket 20 connected by a hinge pin 22 to a bracket 23 rigid with a crosswise extending tongue plate 24.

The frame members may be formed of wood or other structurally strong material, but it is preferred to form the frame members of a metal such as iron, steel, aluminum and the like, having a flat horizontally disposed upper surface 26 on which the trailer floor beam 28 can rest, and with a vertically disposed portion to impart strength and rigidity, as a load bearing member, to the frame. In the preferred practice, the side frame members 10, 12, 14 and 16 are in the form of channel shaped members having a vertically disposed bail portion 32 and vertically spaced flange portions 34 and 36 extending inwardly horizontally from the upper and lower edges of the bail portions.

The tail gate 40, mid cross frame member 42, axle member 44 extend crosswise between the side frame members to maintain the side frame members in their open position, and are foldable to enable the side frame members to be rocked about their pivots to folded or closed position.

The tail gate 40 is dimensioned to have a length corresponding to the distance between the side frame members 14, when in unfolded or open position. One end of the tail gate 40 is secured to the rearward end portion of a side frame member 14 in a manner to permit rocking movement of the tail gate about a vertical axis relative to the side frame member 14, while the other free end portion of the tail gate is adapted releasably to be latched to the rear end portion of the other side frame member 14. As shown in the drawings, FIG. 10, the end of the tail gate is secured to the end of the side frame member 40 by a hinge 47 having one hinge plate 42 fixed to the inner surface of the bail portion of the tail gate 40 while the other hinge plate 44 is fixed to the inner face of the bail portion of the side channel member 14.

In FIGS. 9, 9a and 9b, illustration is made of a means for latching the tail gate 40 to the other of the side frame members 14. As shown, the end of the side channel member 14 is provided with an end plate 46 which extends vertically between the top and bottom flanges 34–36 of the side channel member 14, while the end of the tail gate 40 is similarly provided with an end plate 48. The width of the tail gate is greater than the width of the side frame member 14 so as to enable the end portion of the side frame member 14 to be received within the channel shaped tail gate 40.

A board in the form of a flat plate 50 is mounted on the inner face of the tail gate for sliding movement in the crosswise direction between latching and unlatching positions. In latching position, a member 51 having a height corresponding to the distance between the upper and lower flanges 34–36 of the side channel member, and spaced from the bail portion of the tail gate by an amount corresponding to the thickness of the end plate 46, is positioned within the end portion of the side channel with the end plate 46 between the member 51 and the tail gate 40, as shown in FIGS. 9a and 9b, with the side channel 14 abutting against the inner wall of the tail gate end plate 48. Thus the member 51 and the end plate 48 cooperate to prevent relative movement of the side plate member in the crosswise direction while the member 51 and the tail gate 40 prevent movement of the side frame member 14 in the endwise direction as well as in the vertical direction from unfolded position.

The member 51 is on the outer end of an elongate slide section 52 of smaller dimension which is slidably received within a loop formed between the tail gate and a bracket plate 54 secured, as by welding, to the inside of the tail gate. The other end of the slide plate 52 is provided with a horizontally disposed flange portion 56 which serves as a stop to prevent movement of the slide plate beyond latching position, and an opening 58 is provided in the flanged portion 56 for registry with a bore 60 through a cylindrical section 62 secured to extend from the bracket 54, to enable insertion of a latching pin 64 through the openings which are aligned when the slide plate is in locking position, releasably to latch the slide plate in locking position. The key or pin 64 is permanently attached to the tail gate, to prevent loss, as by means of a chain 66 secured at one end to a ring 68 for retaining the pin while the other end is secured to the bracket 54.

The mid cross bar 42 is similar in construction to the tail gate in that it is formed of a channel shaped cross brace member pivotally secured at one end by a hinge 70 having one hinge plate 72 secured to the inner wall of the side channel member 14 opposite to the one from which the tail gate is pivoted to enable rocking movement of the mid cross bar in the rearward direction. Means are provided on the other end of the mid cross bar 42 releasably to latch the cross bar to the other side frame member 14. The need here is only to latch the cross bar against pivotal movement from the unfolded position. Thus a pin 74, which is slidable through an opening 76, attached to extend forwardly from the vertically disposed bail portion of the mid cross bar, is adapted to be inserted through an opening 78 in the side frame member when in crosswise alignment with the opening 76 when the cross arm is in unfolded position. The pin 74 is retained against loss by means of a chain 80 secured at one end to a pin holding ring 82 while the other end is secured to a portion of the frame.

The axle 44 is supported from the mid section of a pair of arcuate leaf spring assemblies 84 which are suspended at their opposite ends from longitudinally spaced portions of the side frame members, as by means of hanger bracket 86 which are secured to the bottom side of the side frame members in the manner well known to the skilled in the art. The ends of the spring assembly are provided with cylindrical sections 88 rotatably secured by means of a nut and bolt assembly 90 to the bracket 86. The wheels 92 are rotatably supported on portions of the axle which extend beyond opposite sides of the side frame members.

To enable folding movement of the side frame members 14 between unfolded and folded positions, it is necessary to provide means for collapse of the axle 44 to folded position and for return of the elements making up the axle to a rigid member that extends crosswise between the side frame members when in unfolded position.

For this purpose, the axle 44 is subdivided into four sections 100, 102, 104 and 106. The outer sections 100 and 102 are in the form of stub shafts fixed at their mid portions to the respective side channel member via the supporting spring assemblies 84. The outer ends of the inner sections 104 and 106 are pivotally secured to the inner ends of the stub shafts 100 and 102 and the inner ends of the inner sections 104 and 106 are pivotally interconnected to enable the inner sections to be rotated forwardly relative to the respective stub shafts until the sections 104 and 106 are in substantial parallel side by side relation, as shown in FIG. 5, to bring the inner ends of the stub shafts 100 and 102 in end to end relation when in the collapsed position. This defines the extent of movement of the side frame members from unfolded to folded position.

The inner sections 104 and 106 are in the form of channel members of lesser height than that of the stub shafts 100 and 102 to enable the outer end portions 108 and 110 of the inner sections 104 and 106 to be received in fitting relation within the inner portions of the outer sections 100 and 102 for rigid support. Pivotal connection is provided by a bracket 112 secured to a portion of each of the stub shafts 100–102 spaced outwardly from their inner ends to extend forwardly from the shaft, and another bracket 114 is secured to each of the end portions of the inner sections 104 and 106 to extend rearwardly therefrom with aligned openings through the interfitting bracket for pivotal interengagement with a pivot pin 116 whereby the inner section can be rocked relative to the outer section between folded and unfolded positions with the outer ends of the inner sections enclosed within the inner ends of the outer sections when in unfolded position.

The inner ends of the inner sections 104 and 106 are provided with brackets 118 and 120 with a pin 122 extending through aligned openings in the brackets pivotally to interconnect the inner end portion of one inner section for rotational movement relative to the inner end portion of the other between folded and unfolded positions. A channel shaped member 124 of larger dimension is fixed, as an extension, on the inner end of one of the inner sections to enclose the inner end portion of the other section when in the crosswise aligned, unfolded position. The telescoping sections 124 and the inner end portion of the other inner section are secured in their telescoped relation by means of a latch plate 126 similar to that on the end of the tail gate, including a slide plate 128 having an intermediate section 130 dimensioned slidably to extend through a slot formed between the bracket 132 and the inner wall of the bail portion of the channel shaped inner section 106 to support the slide plate 130 for sliding movement crosswise between latching and unlatching positions. The end of the plate 130 is formed with an enlarged end portion 134 offset from the wall by an amount corresponding to the thickness of the enclosing member 124 while the other end is provided with a horizontally disposed flanged portion 136 having an opening 138 adapted to be vertically aligned for registry with the bore of a tubular section 140 secured to extend from the bracket 132. When in latching position, the end wall of the enclosing section 124 is engaged between the member 134 and the embracing end portion of the inner section 106 and the bore through the tubular section 140 is in registry with the opening 138 through the flange to enable the insertion of a locking pin 142 releasably to secure the members in latching position. Again the pin is secured to one end of a chain 144 while the other end is secured to the bracket to retain the pin against loss.

Extensible arms 150 and 152, in the form of wings are pivotally secured on opposite sides to the forward end portion of the converging side frame members 16 for rocking movement of the wing members between spread position, shown in FIG. 1, and partially folded position, shown in FIG. 5. The wing arms 150 and 152 are in the form of short channel members pivoted at their inner ends on the forward end portion of the channel section 16 as by means of a hinge 151 having one hinge plate 153 secured to the inner end of the wing member while the other hinge plate 155 is secured to the bail portion of the side frame member 16. An opening 157 is provided in the top wall of a short channel member 154 secured, as by welding, to the underside of a tongue housing 156. A bracket 159 is secured to a portion of the arms 150–152 spaced from the pivot 151 by an amount to bring the sliding bolt 161 into alignment with the opening 157 for insertion therethrough when the respective arm is rocked to spread position.

The channel members 14, 40 and the wing members 150 and 152 are provided with cornering elements 160 which extend upwardly beyond their upper surfaces, at least in the corner sections, to define a rectangular frame dimensioned to abut the outer walls of the floor panel 28 when in position of use, at rest on the upper surfaces of the channel sections including the tail gate 40, the mid cross bar 42, the wings 150 and 152, and the side frame members, when in open position. Thus the floor panel 28 is supported substantially throughout its outer edge portions as well as intermittently across its length with the cornering elements operative to stabilize the position of the floor panel to provide a relatively large platform which can support substantial load.

When it is desired to fold the trailer, the wing members 150-152 are folded forwardly about their pivots, and the floor panel 28 is removed to free the frame. The pin 64 is withdrawn from the cylinder 60 to unlatch the tail gate. The slide bar 50 is displaced to the left in FIG. 9B to the position shown in FIG. 9 until the movement of the bar is stopped upon engagement of the enlarged end portion 51 with the holding bracket 54. This frees the tail gate 40 to enable the tail gate first to be rocked rearwardly about its pivot 47 to free the side frame member 15 which can be lifted or lowered by an amount sufficient to clear the end of the tail gate 40. The latter is then rocked forwardly about its pivot to a folded position alongside the other side frame member 14, as shown in FIG. 4. The free end of the tail gate 40 is supported in its folded position on the pedestal 162 which is provided as an attachment to extend inwardly horizontally from the adjacent hanger bracket for the leaf spring.

To fold the mid cross bar, the pin 74 is withdrawn. This frees the mid cross bar for rocking movement rearwardly about its pivot, as shown in FIG. 4, until it is folded to extend alongside the side frame member 15, with the end portion resting on a pedestal which may be provided to extend inwardly from the hanger bracket of the adjacent leaf spring.

After the tail gate 40 and the mid cross bar 42 have been folded, the axle can be collapsed by withdrawal of the pin 142. This frees the inner sections 104 and 106 to enable the inner sections to be folded at their inner ends about their common pivot 122 and about their outer ends on their respective pivotal connections to the outer sections 100 and 102. Such folding action takes place as the side frame members are rocked about their forward pivots 20 and 22 in the direction towards each other until the inner sections 104 and 106 lie alongside each other and the outer sections 100 and 102 are in substantially end to end relation, as shown in FIG. 5.

The wing members are folded following removal of the latching pins until the wing sections are alongside the tongue plate, as shown in FIG. 5.

The tongue 18 is supported by the casing 156 in a manner to permit relative longitudinal displacement from an extended position of use, shown in solid lines in FIG. 1, to a retracted position, shown in broken lines in FIG. 1. For this purpose, the tubular housing 156 is formed with a longitudinal bore extending therethrough having a cross section corresponding to the cross section of the tongue 18 to enable longitudinal displacement of the tongue between extended and retracted positions of adjustment with the hitch 164 adjacent the end of the frame plate when in retracted position.

Means are provided to lock the tongue in extended and retracted positions of adjustment. One such means comprises an opening through the top wall of the tubular support and a pair of openings through the tongue 18 with the openings of the pair spaced longitudinally by an amount corresponding to the distance between extended and retracted positions so that one opening will be in registry with the opening through the housing in extended position while the other will be in registry therewith in retracted position to enable a locking pin to be inserted therethrough to lock the tongue in the extended or retracted positions.

When it is desired to open the trailer to unfolded position of use, the pin can be withdrawn to free the tongue for sliding movement forwardly to extended position whereupon the pin can be reinserted in the aligned openings to lock the tongue in extended position.

The side frame members 14–16 are spread apart to unfolded position and the tail gate 40 and mid cross bar 42 are swung about their respective pivots from their folded to unfolded positions. The tail gate 40 is rocked rearwardly beyond its crosswise position to accommodate the end of the side channel member 14 and then the unfolded members are locked in their unfolded position. For this purpose, the key-pin 74 is displaced laterally into the aligned opening 78 in the side channel member 16, the slide plate 152 is displaced laterally until the flange 136 abuts the cylinder 140 and the offset 134 is alongside the member 124 to confine the member 124 between the offset and the intersection 106 whereupon the elements are locked in the open position by insertion of the key-pin 142 through the aligned openings in the cylinder 140 and the opening 138 in the underlying flange. The slide plate 152 is similarly displaced laterally to bring the offset 51 in position to confine the end plate 46 between the offset 51 and the balance of the tail gate 40 with the slide frame member confined between the end of the offset 51 and the end plate 48 of the tail gate. Thus the trailer frame is locked in its open position and the floor panel 28 can then be placed over the supporting frame members for proper location within the cornering brackets. The tail gate is provided with a shelf 49 at the same level as the upper surface of the side channel members for receiving the floor panel thereon with the flange 48 serving to retain the side of the floor panel from sidewise displacement from the frame. The floor panel is then locked in position of use on the frame by engagement with the wing members 150–152 as they are rocked outwardly about their pivots to unfolded position and locked in open position by insertion of the locking pin through the aligned openings. The forward edge portion of the panel thus rests on the wings and retained thereon by the cornering brackets or flanges. The floor panel assists in holding the frame members in their unfolded position of use whereupon the trailer is ready to be hitched onto the power driven wheeled vehicle and to support load for travel over the roads.

It will be understood that changes may be made in the details of construction, arrangement and operation without departing from the spirit of the invention, especially as defined in the following claims.

I claim:

1. A foldable trailer comprising a frame assembly which includes a pair of rigid side frame members in which each member of the pair is pivotally mounted for rocking movement in a horizontal plane about their forward end portions between folded and unfolded positions of adjustment, said side frame members having a rearward portion which extends in spaced parallel relation and a forward portion which extends angularly in the direction towards each other to converge towards the longitudinal center line of the frame, a tail gate pivotally mounted at one end to the rearward end portion of one of the side frame members for rocking movement between folded and unfolded position, and means releasably latching the other end portion of the tail gate to the rearward end portion of the other of the side frame members when in unfolded position, at least one mid cross brace member pivoted at one end to a mid portion of one of the side frame members for rocking movement in a horizontal plane between folded and unfolded positions and means releasably latching the other end of the mid cross brace member to the other side frame member when in unfolded position to extend crosswise between the side frame members, an axle assembly subdivided into segments including a pair of outer segments and a pair of inner segments, means supporting the outer segments from the outer side frame members, means pivotally mounting the outer ends of the inner segments to the inner segments to the inner ends of the outer segments for rocking movement of the inner segments relative to the outer segments about a horizontal plane and means pivotally interconnecting the inner ends of the inner segments for relative rocking movement about a horizontal plane between folded and unfolded positions of adjustment, and latching means for releasably locking the inner segments against pivotal movement from unfolded position with the segments extending crosswise of the frame, wing members pivotally mounted to the forward end portion of the side frame members for rocking movement about a horizontal plane between spread and folded positions of adjustment, and means for releasably latching the wing members in unfolded position to extend outwardly from the side frame members, and tongue means for connecting the frame to a powered vehicle.

2. A foldable trailer as claimed in claim 1 in which the side frame members, tail gate, cross brace members and wing members are in the form of channel sections having a flat upper surface with a depending bail portion.

3. A foldable trailer as claimed in claim 2 in which the upper surfaces of the side frame members, tail gate, mid cross brace members and wing members are at a uniform level, when in unfolded position, to provide support for a floor panel.

4. A foldable trailer as claimed in claim 1 which includes a floor panel adapted to be positioned on the frame assembly when in unfolded position.

5. A foldable trailer as claimed in claim 4 which includes cornering brackets extending upwardly from outer edge portions of the elements making up the frame assembly to define a space therebetween corresponding to the dimensions of the floor panel to receive the floor panel in fitting relation therebetween.

6. A foldable trailer as claimed in claim 1 in which the tail gate is mounted to swing forwardly about its pivot to lie alongside the side frame member when in folded position.

7. A foldable trailer as claimed in claim 1 in which the mid cross brace member is pivoted to the side frame member opposite that to which the tail gate is pivoted and in which the mid cross brace member is mounted to swing rearwardly to lie alongside the side frame member when in folded position.

8. A foldable trailer as claimed in claim 1 which includes wheels rotatably mounted on the outer end portions of the outer axle segments which extend outwardly beyond the side frame members.

9. A foldable trailer as claimed in claim 1 which includes a leaf spring assembly suspended from the underside of each of the side frame members to extend longitudinally thereof and in which the outer axle members are secured to the leaf spring members for support.

10. A foldable trailer as claimed in claim 1 in which the inner axle segments are pivoted from the inner ends of the outer segments in a manner to rock in the forwardly direction about their pivot to folded position whereby the inner segments extend longitudinally of the frame alongside each other when in folded position, while the inner ends of the outer segments are substantially aligned to extend crosswise in end to end relation.

11. A foldable trailer as claimed in claim 1 in which the tongue means comprises an elongate housing secured to the frame to extend longitudinally along the center line thereof, an elongate tongue member supported within the housing for relative longitudinal movement between extended and retracted positions of adjustment, and means for securing the tongue to the housing when in extended position and when in retracted position, and a trailer hitch on the forward end portion of the tongue.

* * * * *